United States Patent
Zhang et al.

(10) Patent No.: US 9,888,223 B2
(45) Date of Patent: Feb. 6, 2018

(54) DISPLAY PROCESSING SYSTEM, DISPLAY PROCESSING METHOD, AND ELECTRONIC DEVICE

(71) Applicants: BOE TECHNOLOGY GROUP CO., LTD., Beijing (CN); K-TRONICS (SU ZHOU) TECHNOLOGY CO., LTD., Suzhou, Jiangsu Province (CN)

(72) Inventors: Xiao Zhang, Beijing (CN); Xitong Ma, Beijing (CN); Shuhuan Yu, Beijing (CN); Lijie Zhang, Beijing (CN)

(73) Assignees: BOE TECHNOLOGY GROUP CO., LTD., Beijing (CN); K-TRONICS (SU ZHOU) TECHNOLOGY CO., LTD., Suzhou, Jiangsu Province (KR)

( * ) Notice: Subject to any disclaimer, the term of this patent is extended or adjusted under 35 U.S.C. 154(b) by 133 days.

(21) Appl. No.: 14/764,909

(22) PCT Filed: Nov. 10, 2014

(86) PCT No.: PCT/CN2014/090713
§ 371 (c)(1),
(2) Date: Jul. 30, 2015

(87) PCT Pub. No.: WO2016/004715
PCT Pub. Date: Jan. 14, 2016

(65) Prior Publication Data
US 2016/0255325 A1    Sep. 1, 2016

(30) Foreign Application Priority Data

Jul. 9, 2014  (CN) .......................... 2014 1 0325206

(51) Int. Cl.
*H04N 7/18*       (2006.01)
*H04N 13/00*      (2006.01)
*H04N 13/04*      (2006.01)

(52) U.S. Cl.
CPC ...... *H04N 13/0029* (2013.01); *H04N 13/0037* (2013.01); *H04N 13/0059* (2013.01); *H04N 13/04* (2013.01); *H04N 2213/007* (2013.01)

(58) Field of Classification Search
CPC ............... H04N 13/0029; H04N 13/00; H04N 13/0037; H04N 13/0059
(Continued)

(56) References Cited

U.S. PATENT DOCUMENTS

| 2011/0032329 | A1 | 2/2011 | Bauza et al. |
| 2011/0182363 | A1* | 7/2011 | Lin .................... H04N 13/0029 375/240.25 |
| 2012/0092335 | A1 | 4/2012 | Kim et al. |

FOREIGN PATENT DOCUMENTS

| CN | 101198074 B | 4/2011 |
| CN | 102158718 A | 8/2011 |

(Continued)

OTHER PUBLICATIONS

Second Office Action regarding Chinese application No. 201410325206.1, dated Mar. 29, 2016. Translation provided by Dragon Intellectual Property Law Firm.
(Continued)

*Primary Examiner* — Leron Beck
(74) *Attorney, Agent, or Firm* — Harness, Dickey & Pierce, P.L.C.

(57) ABSTRACT

The display processing system according to an embodiment of the present disclosure may include: at least one receiving module, configured to receive source three-dimensional (3D) display data for a source 3D display mode and transmitted in a source data transmission format; a first converting module, configured to convert the source 3D display data into source RGB data; a second converting module, configured to convert the source RGB data into target RGB data for a target 3D display mode; a third converting module, con-
(Continued)

figured to convert the target RGB data into target 3D display data in a target data transmission format; and a transmitting module, configured to transmit the target 3D display data in the target data transmission format to a data driving circuit connected with a display panel.

20 Claims, 4 Drawing Sheets

(58) Field of Classification Search
 USPC .......................................................... 348/43
 See application file for complete search history.

(56) References Cited

FOREIGN PATENT DOCUMENTS

| CN | 102461185 A | 5/2012 |
|---|---|---|
| CN | 102484734 A | 5/2012 |
| CN | 102682465 A | 9/2012 |
| CN | 103581652 A | 2/2014 |
| CN | 103841391 A | 6/2014 |
| CN | 104125448 A | 10/2014 |

OTHER PUBLICATIONS

First Office Action regarding Chinese application No. 201410325206.1, dated Sep. 14, 2015. Translation provided by Dragon Intellectual Property Law Firm.
Video conversion system based on F.P.G.A. for 3D display.
Written Opinion of the International Searching Authority for international application No. PCT/CN2014/090713.

* cited by examiner

DISPLAY PROCESSING SYSTEM, DISPLAY PROCESSING METHOD, AND ELECTRONIC DEVICE

CROSS-REFERENCE TO RELATED APPLICATIONS

This application is the U.S. national phase of PCT Application No. PCT/CN2014/090713 filed on Nov. 10, 2014, which claims priority to Chinese Patent Application No. 201410325206.1 filed on Jul. 09, 2014, the disclosures of which are incorporated in their entirety by reference herein.

TECHNICAL FIELD

The present disclosure relates to the field of displaying technology, in particular to a display processing system, a display processing method and an electronic device.

BACKGROUND

Three dimensional (3D) displaying has been widely recognized as perfect displaying technology and a large number of enterprises and institutes have been involved in this field. In particular, many developed countries, such as Japan, USA, Europe and Korea, have been working in the 3D displaying field ever since 1980s, and achieved a great deal of developments, greater or smaller, from 1990s. At present, two main 3D display technologies, including the one with wearing 3D glasses and the one without wearing 3D glasses, have been developed.

Even though there are a great number of 3D displaying technologies, their basic theories are quite similar. Specifically, different images are viewed by the left-eye and the right-eye respectively, and then the human brain may regenerate a new image by overlapping the information on the different images viewed by the left-eye and the right-eye, so as to obtain an image having a 3D effect.

The 3D displaying technology with wearing 3D glasses is subdivided into two kinds of 3D technologies, including polarized-light 3D technology and shutter 3D technology as well known. On one hand, the polarized-light 3D technology is based on the theory that light has a polarized direction and is achieved by dividing the original images. Specifically the images can be divided into two sets of images including vertically polarized light images and horizontally polarized light images by the polarized-light 3D technology. And the left-eye glass and the right-eye glass adopt polarized light lens having different polarization directions respectively. In this way, left-eye and right-eye of a human can receive different images, so as to achieve a 3D display. On the other hand, the shutter 3D display technology is realized by displaying the images for the left-eye and the images for the right-eye alternately, while refreshing the 3D glasses simultaneously, so as to enable left-eye and right-eye of a human to observe corresponding images for the left-eye and the right-eye alternately, thereby stereo images.

It can be seen from the above, due to different data arrangements, a conventional electronic device which only originally supports one kind of 3D display mode can hardly be used for a user to view 3D video images with another kind of 3D display modes.

SUMMARY

Embodiments of the present disclosure provide a display processing system, a display processing method and an electronic device, so that a same electronic device can be used for viewing video images with different 3D display modes.

According to an aspect of the present disclosure, there provided a display processing system, which may include: at least one receiving module, configured to receive source three-dimensional (3D) display data for a source 3D display mode and transmitted in a source data transmission format; a first converting module, configured to convert the source 3D display data into source RGB data; a second converting module, configured to convert the source RGB data into target RGB data for a target 3D display mode; a third converting module, configured to convert the target RGB data into target 3D display data in a target data transmission format; and a transmitting module, configured to transmit the target 3D display data in the target data transmission format to a data driving circuit connected with a display panel.

Alternatively, in the display processing system, there may be a plurality of receiving modules, each of which corresponds to a different data transmission format.

Alternatively, in the display processing system, the source data transmission format may be a V-by-One format, a digital video interface (DVI) format, or a high definition multimedia interface (HDMI) format; and the target data transmission format may be the V-by-One format, the DVI format, or the HDMI format.

Alternatively, in the display processing system, the source 3D display data may be of a first frequency; the target 3D display data may be of a second frequency higher than the first frequency; and the second converting module may include: a frequency multiplier, configured to conduct frequency multiplication on the source RGB data, so as to obtain an intermediate RGB data having the second frequency; and a second converting unit, configured to convert the intermediate RGB data into the target RGB data for the target 3D display mode.

Alternatively, in the display processing system, the source 3D display mode may be a frame-by-frame mode, a row-by-row mode, or a combination thereof; and the target 3D display mode may be the frame-by-frame mode, the row-by-row mode, or the combination thereof.

Alternatively, in the display processing system, both the source 3D display data and the target 3D display data may be ultra high definition (UHD) display data.

According to another aspect of the present disclosure, there provided a display processing method, which may include the following steps: receiving source three-dimensional (3D) display data for a source 3D display mode and transmitted in a source data transmission format; converting the source 3D display data into source RGB data; converting the source RGB data into target RGB data for a target 3D display mode; converting the target RGB data into target 3D display data in a target data transmission format; and transmitting the target 3D display data in the target data transmission format to a data driving circuit connected with a display panel.

Alternatively, in the display processing method, the source data transmission format may be a V-by-One format, a digital video interface (DVI) format, or a high definition multimedia interface (HDMI) format; and the target data transmission format may be the V-by-One format, the DVI format, or the HDMI format.

Alternatively, in the display processing method, the source 3D display data may be of a first frequency; the target 3D display data may be of a second frequency higher than the first frequency; and the step of converting the source RGB data into the target RGB data for the target 3D display mode may include: conducting frequency multiplication on the source RGB data, so as to obtain an intermediate RGB data having the second frequency; and converting the intermediate RGB data into the target RGB data for the target 3D display mode.

Alternatively, in the display processing method, the source 3D display mode may be a frame-by-frame mode, a row-by-row mode, or a combination thereof; and the target 3D display mode may be the frame-by-frame mode, the row-by-row mode, or the combination thereof.

Alternatively, in the display processing method, both the source 3D display data and the target 3D display data may be ultra high definition (UHD) display data.

According to yet another aspect of the present disclosure, there is provided an electronic device, which may include any one of the above display processing systems.

According to the embodiment of the present disclosure, based on 3D display modes supported by the electronic device, when the 3D display mode of the received 3D display data is different from the 3D display mode originally supported by the electronic device, the received 3D display data may be converted into the 3D display mode originally supported by the electronic device, so that the electronic device can support multiple 3D display modes.

DETAILED DESCRIPTION

According to the display processing system, the display processing method and the electronic device provided by the embodiment of the present disclosure, by conducting a conversion on 3D display mode of the 3D display data, the electronic device can support multiple 3D display modes.

Figure 1:
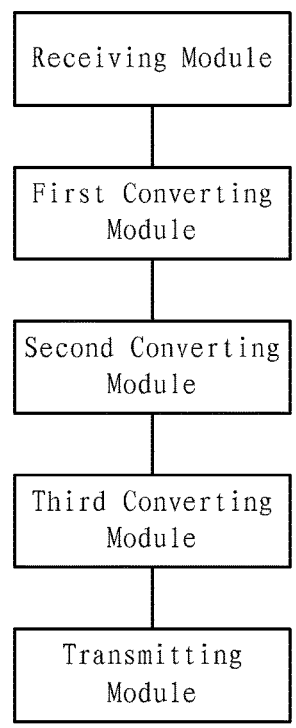
FIG. 1 is a block diagram which illustrates a structure of a display processing system according to an embodiment of the present disclosure.

As shown in FIG. 1, the display processing system may include:

at least one receiving module, configured to receive source three-dimensional (3D) display data for a source 3D display mode and transmitted in a source data transmission format;

a first converting module, configured to convert the source 3D display data into source RGB data;

a second converting module, configured to convert the source RGB data into target RGB data for a target 3D display mode;

a third converting module, configured to convert the target RGB data into target 3D display data in a target data transmission format; and a transmitting module, configured to transmit the target 3D display data in the target data transmission format to a data driving circuit connected with a display panel.

In the above display processing system, the source 3D display mode may be any one of various display modes such as a frame-by-frame mode, a row-by-row mode, or a combination thereof; and the target 3D display mode may be any one of various display modes such as the frame-by-frame mode, the row-by-row mode, or the combination thereof.

In the embodiment of the present disclosure, when source 3D display mode of the received source 3D display data is different from target 3D display mode supported by an electronic device, according to difference between two data encoding methods for these two 3D display modes, the source 3D display data is converted into the target 3D display data, so that the resultant target 3D display mode of thereof can be supported by the electronic device, thereby achieving proper 3D display.

As a result, by configuring the display processing system, the electronic device according to the embodiment of the present disclosure can be arranged to support multiple 3D display modes with at low cost.

In the following, several methods for conversion will be described in details.

It is assumed that the target display mode is a frame-by-frame mode, while the source display mode is a row-by-row mode.

Figure 2:
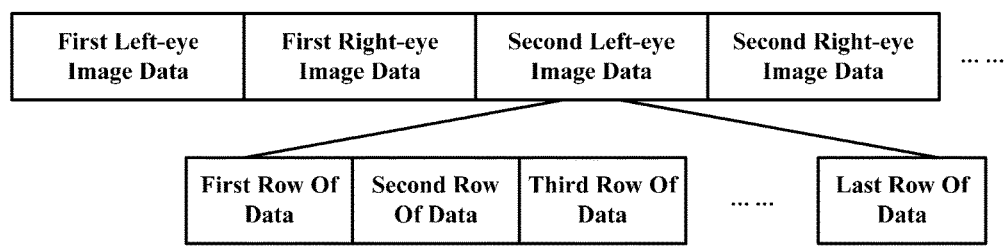
FIG. 2 is a schematic view illustrating data arrangement with a frame-by-frame mode according to an embodiment of the present disclosure.
Figure 3:
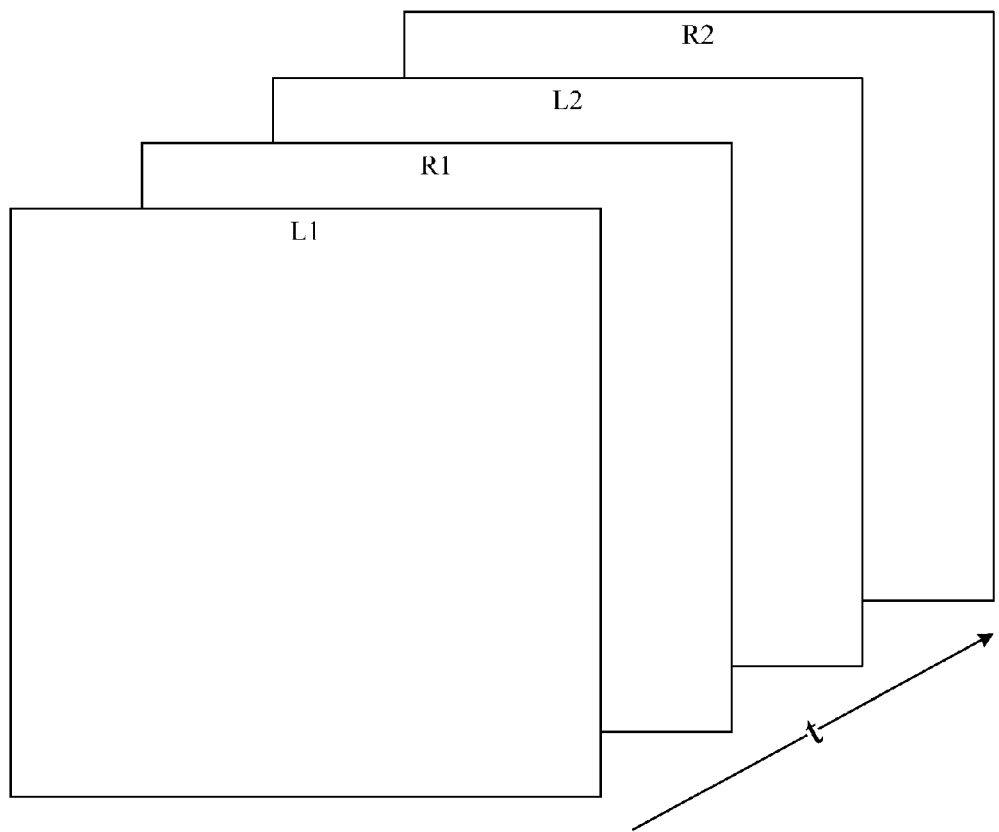
FIG. 3 is a schematic view illustrating image display with the frame-by-frame mode according to an embodiment of the present disclosure.

In the data arrangement as illustrated in FIG. 2, when the target display mode is the frame-by-frame mode, the left-eye image data and the right-eye image data are arranged alternately at a unit of frame, while each of the images are also arranged according to rows. In other words, during the process of the image display as illustrated in FIG. 3, at an temporal axis t, a display device firstly displays a first left-eye image L1, then displays a first right-eye image R1, then displays a second left-eye image L2, then displays a second right-eye image R2, and so on.

In the frame-by-frame mode, as long as 3D glasses are switched cooperatively, a 3D display can be achieved. In other words, when left-eye images are displayed, left-eye lens are turned on while right-eye lens are turned off. When right-eye images are displayed, left-eye lens are turned off while right-eye lens are turned on.

Figure 4:
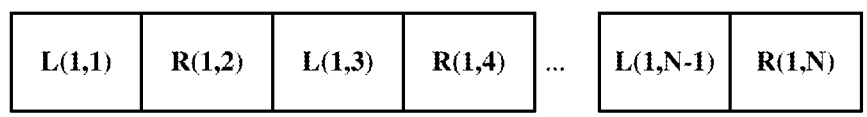
FIG. 4 is a schematic view illustrating data arrangement with a row-by-row mode according to an embodiment of the present disclosure.
Figure 5:
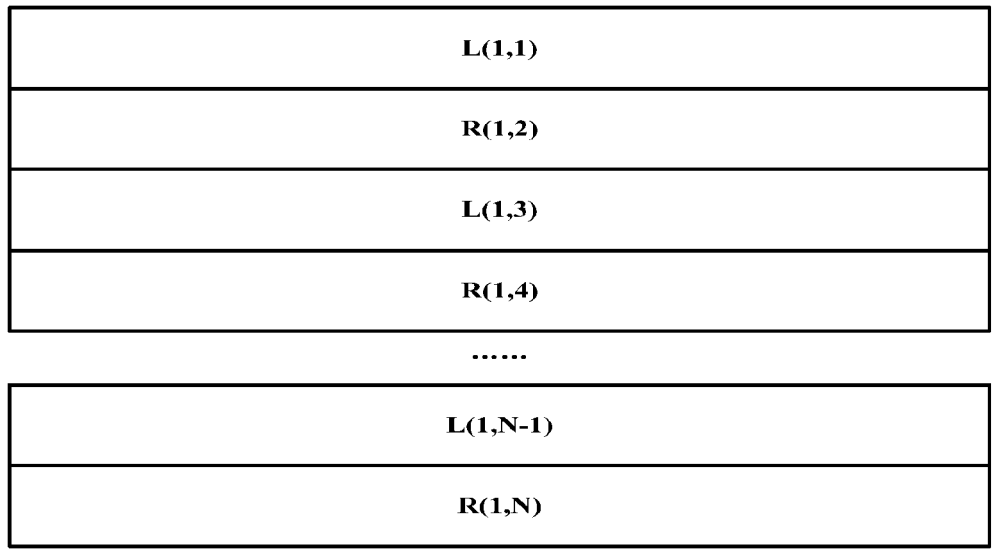
FIG. 5 is a schematic view illustrating image display with the row-by-row mode according to an embodiment of the present disclosure.

FIG. 4 illustrates the data arrangement when the target display mode is the row-by-row mode. It can be seen from FIG. 4, the data arrangement is no longer an alternate arrangement of left-eye image data and right-eye image data, and instead left-eye image data and right-eye image data are arranged alternately at a unit of row. In other words, during the process of the image display as illustrated in FIG. 5, at a temporal axis, each of images displayed by the display device consists of a portion for left-eye image and a portion for right-eye image.

In the row-by-row mode, it is necessary to divide each of images to achieve a 3D display.

Therefore a conventional electronic device can only support one kind of 3D display mode.

Figure 6:
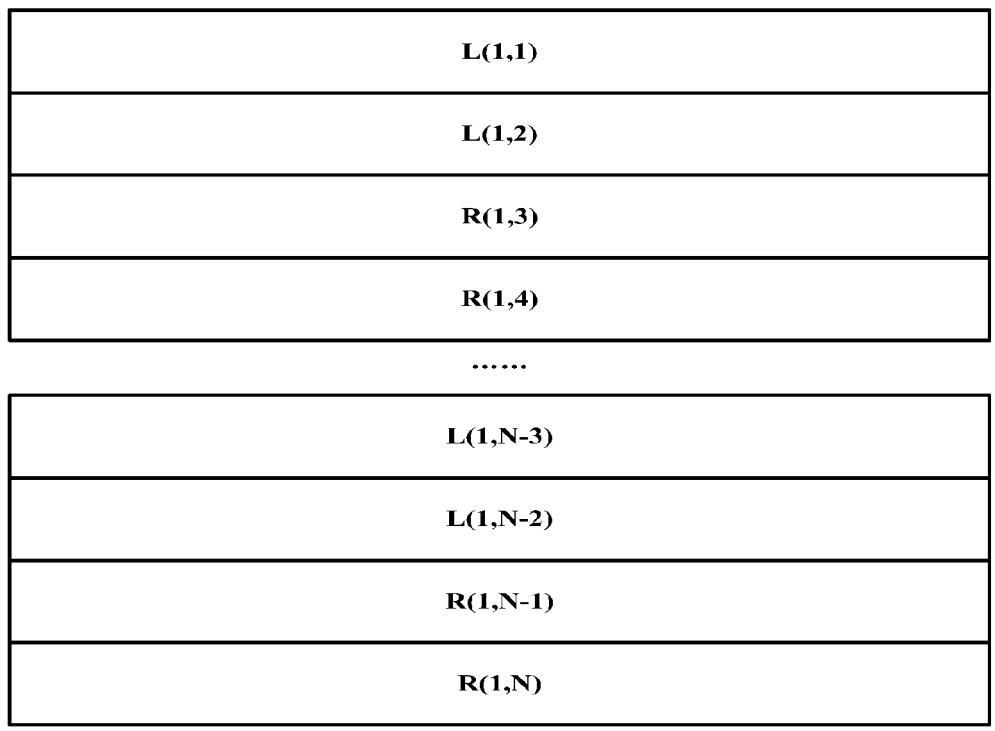
FIG. 6 is a schematic view illustrating image display with another row-by-row mode according to an embodiment of the present disclosure.

However, it is appreciated that the above 3D data encoding method is only an example, and the embodiments of the present disclosure are not limited thereto. For example, data arrangement with the row-by-row mode can also be in each frame, wherein left-eye image data and right-eye image data are arranged alternately at a unit of two rows. Accordingly a corresponding image in this kind of data arrangement is shown in FIG. 6.

In view of above, after hard workings, the inventors found out that, due to a same image required to be presented finally, RGB data that is with different 3D display modes and constitutes image data is substantially the same, and the only difference lies in that such RGB data has been encoded to different locations. Furthermore, when being displayed at different timings, different 3D display modes can be achieved. For example, with respect to a first right-eye image, as shown in FIG. 3, data in the second row thereof is displayed in the second frame with the frame-by-frame mode. In contrast, as shown in FIG. 5, with respect to the first right-eye image, data R(1, 2) in the second row thereof is displayed in the first frame with the row-by-row mode. However, the data remains the same.

Under the above data encoding principle, as long as locations of pixel data change, data for a certain 3D display mode can be converted into data for another 3D display mode.

The detailed description will be given in connection with FIG. 2 and FIG. 4 as below.

When the target display mode is the frame-by-frame mode, while the source display mode is the row-by-row mode, it is necessary to convert the data arrangement as shown in FIG. 4 into the data arrangement as shown in FIG. 2, so that 3D display mode conversion can be achieved.

With respect to the cases shown in FIG. 2 and FIG. 4, firstly the 3D display data corresponding to respective images is extracted based on an arrangement of 3D display data for the row-by-row mode, and then the 3D display data is re-sequenced at a unit of row. Thereafter, the 3D display data of these images is re-sequenced at a unit of frame. As a result, a data arrangement as shown in FIG. 2 is obtained.

It can be appreciated that, in the case of determination according to 3D display mode (corresponding to a data encoding method), an actual location of display data of respective pixels in the original data and a target location thereof in the target data can be obtained by calculation. Therefore, a second converting module according to this embodiment of the present disclosure is actually configured to re-sequence data arrangement, which will not be described in detail.

In consideration of difference of luminance processing for different 3D display modes, an adjustment process for adjusting values may be carried out on the data sequence after the re-sequence processing, according to encoding need of the target 3D display mode, thereby improving display effect.

For example, with respect to 3D display mode A, for a certain pixel, a premium display effect can be achieved when luminance thereof is certain times of its original luminance (i.e., corresponding to luminance obtained from original data). On the other hand, with respect to 3D display mode B, for a certain pixel, the premium display effect can be achieved when luminance thereof is the original luminance. Therefore, provided that a conversion from 3D display mode A to 3D display mode B is needed, both the above data locations and data values have to be changed, so as to accommodate for luminance change need with respect to different 3D display modes. The above description is based on a conversion from the row-by-row mode to the frame-by-frame mode, which is also applicable to conversions for other kinds of 3D modes. The detailed description thereof will be omitted in the present disclosure.

With continuing development of modern technology, many kinds of new transmission interfaces have been proposed. In order to improve access capability of the electronic device, in embodiment of the present disclosure, there are provided several receiving modules, each of which corresponds to a different data transmission format.

In the embodiment of the present disclosure, by configuring a plurality of receiving modules corresponding to different data transmission formats, it can further improve access capability of the electronic device, conduct processing collectively on 3D display data in different formats transmitted from different transmission interfaces, so as to enable the electronic device to support different interfaces and different 3D display modes, thereby improving flexibility and extendibility of the electronic device.

In the embodiment of the present disclosure, both the source data transmission format and the target transmission format may be any of various high speed data transmission formats, such as a V-by-One format, a digital video interface (DVI) format, or a high definition multimedia interface (HDMI) format and so forth.

However, with respect to different 3D display modes, frequencies for the corresponding 3D display data might be different. For example, with respect to the row-by-row mode, due to the fact that a same image includes left-eye data and right-eye data simultaneously, a frequency for the 3D display data is merely needed to be 60 Hz. In contrast, with respect to the frame-by-frame mode, due to the fact that an image only includes either left-eye data or right-eye data, its frequency is needed to be higher than that for the row-by-row mode, and has to be 120 Hz or more for viewing need of a user.

Therefore, with respect to the conversion between different 3D display modes, when the source 3D display data is of a first frequency and the target 3D display data is of a second frequency higher than the first frequency, the second converting module may specifically include:

a frequency multiplier, configured to conduct frequency multiplication on the source RGB data, so as to obtain an intermediate RGB data having the second frequency; and a second converting unit, configured to convert the intermediate RGB data into the target RGB data for the target 3D display mode.

Through the above frequency multiplication, the resultant data can accommodate for frequency need of the corresponding 3D display mode, thereby further improving the playing effect of the converted 3D display data.

The system according to this embodiment of the present disclosure may be applied to display devices with different modes.

For example, the system may be applied to an Ultra High-Definition (UHD) display device. Here, the UHD refers to official name for displaying with "4K resolution (3840×2160 pixels)" approved recently by International Telecommunication Union (ITU). Besides, The called UHD is also applicable to "8K resolution (7680×4320 pixels)".

Because higher resolution brings about more delicate display effect, an increasing number of electronic devices at present are supporting 4K UHD.

As more and more electronic devices start supporting UHD, the display processing system according to the embodiment of the present disclosure can also be applied to the UHD display device. In other words, both the source 3D display data and the target 3D display data are UHD display data.

Figure 7:
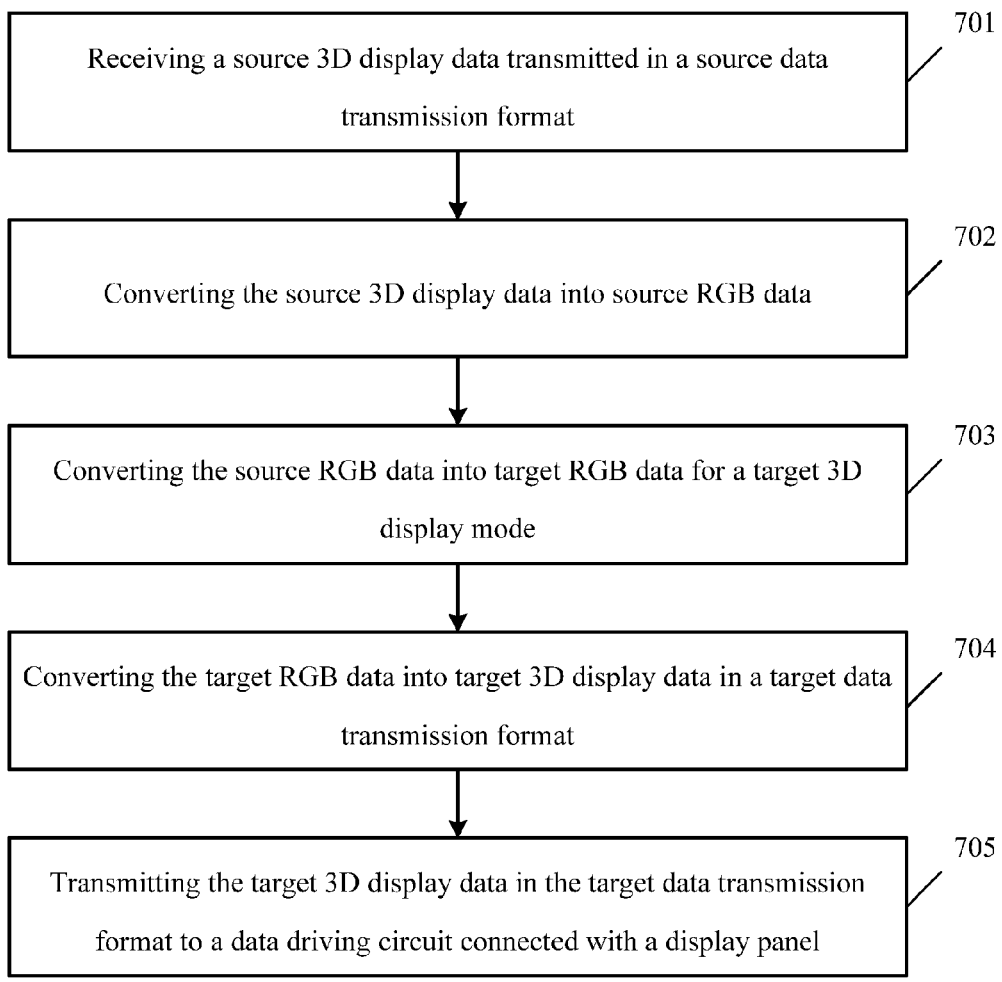
FIG. 7 is a flow chart illustrating a display processing method according to an embodiment of the present disclosure.

In order to achieve the above object, there is provided a display processing method according to an embodiment of the present disclosure. As shown in FIG. 7, the method includes:

Step S701, receiving source three-dimensional (3D) display data for a source 3D display mode and transmitted in a source data transmission format;

Step S702, converting the source 3D display data into source RGB data;

Step S703, converting the source RGB data into target RGB data for a target 3D display mode;

Step S704, converting the target RGB data into target 3D display data in a target data transmission format; and Step S705, transmitting the target 3D display data in the target data transmission format to a data driving circuit connected with a display panel.

In the above display processing method, the source data transmission format is a V-by-One format, a DVI format, or a HDMI format; and the target data transmission format is the V-by-One format, the DVI format, or the HDMI format.

In the above display processing method, the source 3D display data is of a first frequency; the target 3D display data is of a second frequency higher than the first frequency. The step of converting the source RGB data into the target RGB data for the target 3D display mode may include:

conducting frequency multiplication on the source RGB data, so as to obtain an intermediate RGB data having the second frequency; and converting the intermediate RGB data into the target RGB data for the target 3D display mode.

In the above display processing method, the 3D display mode is a frame-by-frame mode, a row-by-row mode, or a combination thereof.

In the above display processing method, both the source 3D display data and the target 3D display data are UHD 3D display data.

In order to achieve the above object, there is further provided an electronic device, which includes the above display processing system.

In the following, the display processing system according to the embodiment of the present disclosure will be further described in details.

Figure 8:
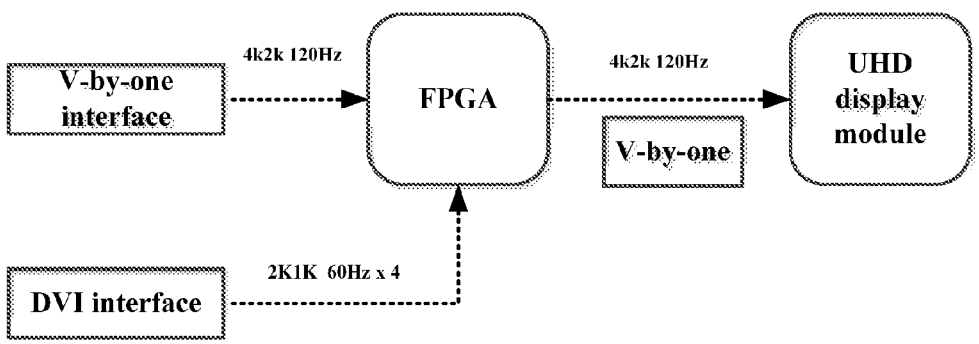
FIG. 8 is a schematic view illustrating a hardware structure of the display processing system according to an embodiment of the present disclosure.

As shown in FIG. 8, it is assumed that the display processing system according to the embodiment of the present disclosure supports two input interfaces, i.e., the V-by-One interface and the DVI interface. Besides, an interface between the display processing system and a data driving circuit is the V-by-One interface, while the target 3D display mode supported by the electronic device is the frame by frame mode.

When Field-Programmable Gate Array (FPGA) receives via the V-by-One input interface the UHD 3D display data (4K2K@ 120 Hz) for frame-by-frame mode inputted from eight zones, because the target 3D display mode supported by the electronic device is the frame-by-frame mode, at this point the FPGA plays a role of data transparent transmission, i.e. data is transmitted to UHD display module for displaying directly via the V-by-One output interface.

On the other hand, when the FPGA receives via the V-by-One input interface the UHD 3D display data (4K2K@ 120 Hz) for line-by-line mode, because the target 3D display mode supported by the electronic device is the frame-by-frame mode, at this point the FPGA re-sequences the received data according to data correspondence between different 3D display modes to obtain data for the frame-by-frame mode, and then transmits the resultant data to the UHD display module for displaying via the V-by-One output interface.

It is appreciated that the above conversion is always imposed on original RGB data during the data conversion processes corresponding to different 3D display modes.

Moreover, when the FPGA receives via the DVI input interface the 3D display data (2K1K@60 Hz, divided into 4 groups) for frame-by-frame mode, the target 3D display mode supported by the electronic device is also the frame-by-frame mode, while its frequency is quite low, so that at this point only frequency multiplication is needed, i.e. the data may be transmitted to the UHD display module for displaying via the V-by-One output interface.

On the other hand, when the FPGA receives via the DVI input interface the UHD 3D display data (2K1K@60 Hz, divided into 4 groups) with line-by-line mode, because the target 3D display mode supported by the electronic device is the frame-by-frame mode, at this point the FPGA is required to conduct frequency multiplication in the first place. And then the FPGA re-sequences the resultant data after the frequency multiplication according to data correspondence between different 3D display modes to obtain data for the frame-by-frame mode, and then transmits the resultant data to the UHD display module for displaying via the V-by-One output interface.

It is appreciated that the above types of interfaces and 3D display modes are only examples. And the embodiments of the present disclosure are not limited to the above types of interfaces and 3D display modes.

The above are merely some embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A display processing system, comprising:
    at least one receiving circuit configured to receive source three-dimensional (3D) display data for a source 3D display mode and transmitted in a source data transmission format;
    a first converting circuit configured to convert the source 3D display data into source RGB data;
    a second converting circuit configured to convert the source RGB data into target RGB data for a target 3D display mode;
    an adjusting circuit configured to adjust values of the target RGB data converted by the second converting circuit according to an encoding need of the target 3D display mode;
    a third converting circuit configured to convert the adjusted target RGB data into target 3D display data in a target data transmission format; and
    a transmitting circuit configured to transmit the target 3D display data in the target data transmission format to a data driving circuit connected with a display panel,
    wherein the second converting circuit converts data for a first pixel in a first image frame included in the source RGB data into data for a second pixel in a second image frame included in the target RGB data, wherein the data for the first pixel is same as the data for the second pixel, and a location of the first pixel is different from a location of the second pixel in the display panel.

2. The display processing system according to claim 1, further comprising a plurality of receiving circuits, each receiving circuit of the plurality of receiving circuits corresponds to a different data transmission format.

3. The display processing system according to claim 2, wherein the source data transmission format is a V-by-One format, a digital video interface (DVI) format, or a high definition multimedia interface (HDMI) format; and
the target data transmission format is the V-by-One format, the DVI format, or the HDMI format.

4. The display processing system according to claim 1, wherein the source 3D display data is of a first frequency;
the target 3D display data is of a second frequency higher than the first frequency; and
the second converting circuit comprising:
a frequency multiplier circuit configured to conduct frequency multiplication on the source RGB data, so as to obtain an intermediate RGB data having the second frequency; and
a fourth converting circuit configured to convert the intermediate RGB data into the target RGB data for the target 3D display mode.

5. The display processing system according to claim 1, wherein the source 3D display mode is a frame-by-frame mode, a row-by-row mode, or a combination thereof; and
the target 3D display mode is the frame-by-frame mode, the row-by-row mode, or the combination thereof.

6. The display processing system according to claim 1, wherein both the source 3D display data and the target 3D display data are ultra-high definition (UHD) display data.

7. A display processing method, comprising the following steps:
receiving source three-dimensional (3D) display data for a source 3D display mode and transmitted in a source data transmission format;
converting the source 3D display data into source RGB data;
converting the source RGB data into target RGB data for a target 3D display mode;
adjusting values of the converted target RGB data according to an encoding need of the target 3D display mode;
converting the adjusted target RGB data into target 3D display data in a target data transmission format; and
transmitting the target 3D display data in the target data transmission format to a data driving circuit connected with a display panel,
wherein converting the source RGB data into the target RGB data for the target 3D display mode comprises:
converting data for a first pixel in a first image, frame included in the source RGB data into data for a second pixel in a second image frame included in the target RGB data, wherein the data for the first pixel is same as the data for the second pixel and a location of the first pixel is different from a location of the second pixel in the display panel.

8. The display processing method according to claim 7, wherein the source data transmission format is a V-by-One format, a digital video interface (DVI) format, or a high definition multimedia interface (HDMI) format; and
the target data transmission format is the V-by-One format, the DVI format, or the HDMI format.

9. The display processing method according to claim 7, wherein the source 3D display data is of a first frequency;
the target 3D display data is of a second frequency higher than the first frequency; and the step of converting the source RGB data into the target RGB data for the target 3D display mode comprises:
conducting frequency multiplication on the source RGB data, so as to obtain an intermediate RGB data having the second frequency; and
converting the intermediate RGB data into the target RGB data for the target 3D display mode.

10. The display processing method according to claim 7, wherein the source 3D display mode is a frame-by-frame mode, a row-by-row mode, or a combination thereof; and
the target 3D display mode is the frame-by-frame mode, the row-by-row mode, or the combination thereof.

11. The display processing method according to claim 7, wherein both the source 3D display data and the target 3D display data are ultra-high definition (UHD) display data.

12. An electronic device, comprising a display panel and the display processing system according to claim 1.

13. A display processing system supporting a plurality of three-dimensional (3D) display data for different 3D display modes, the display processing system comprising:
a receiving circuit configured to receive source 3D display data for a source 3D display mode;
a first converting circuit configured to convert the source 3D display data into source RGB data;
a second converting circuit configured to convert the source RGB data into target RGB data for a target 3D display mode;
an adjusting circuit configured to adjust values of the target RGB data converted by the second converting circuit according to an encoding need of the target 3D display mode;
a third converting circuit configured to convert the adjusted target RGB data into target 3D display data in a target data transmission format; and
a transmitting circuit configured to transmit the target 3D display data in the target data transmission format to a data driving circuit connected with a display panel,
wherein the second converting circuit converts data for a first pixel in a first ima e frame included in the source RGB data into data for a second pixel in a second image frame included in the target RGB data, wherein the data for the first pixel is same as the data for the second pixel, and a location of the first pixel is different from a location of the second pixel in the display panel.

14. The display processing system according to claim 2, wherein both the source 3D display data and the target 3D display data are ultra-high definition (UHD) display data.

15. The display processing system according to claim 3, wherein both the source 3D display data and the target 3D display data are ultra-high definition (UHD) display data.

16. The display processing method according to claim 8, wherein both the source 3D display data and the target 3D display data are ultra-high definition (UHD) display data.

17. The display processing method according to claim 9, wherein both the source 3D display data and the target 3D display data are ultra-high definition (UHD) display data.

18. An electronic device, comprising a display panel and the display processing system according to claim 2.

19. An electronic device, comprising a display panel and the display processing system according to claim 3.

20. An electronic device, comprising a display panel and the display processing system according to claim 4.

* * * * *